(12) United States Patent
Bares et al.

(10) Patent No.: US 10,989,263 B2
(45) Date of Patent: Apr. 27, 2021

(54) FRICTION MATERIAL

(71) Applicant: BorgWarner Inc., Auburn Hills, MI (US)

(72) Inventors: Jason Bares, Rochester, MI (US); Feng Dong, Rochester, MI (US); Robert Lam, Rochester, MI (US); Wanjun Liu, Troy, MI (US)

(73) Assignee: BorgWarner Inc., Auburn Hills, MI (US)

( * ) Notice: Subject to any disclaimer, the term of this patent is extended or adjusted under 35 U.S.C. 154(b) by 28 days.

(21) Appl. No.: 16/348,931

(22) PCT Filed: Nov. 15, 2016

(86) PCT No.: PCT/US2016/062071
§ 371 (c)(1),
(2) Date: May 10, 2019

(87) PCT Pub. No.: WO2018/093353
PCT Pub. Date: May 24, 2018

(65) Prior Publication Data
US 2019/0264766 A1    Aug. 29, 2019

(51) Int. Cl.
*F16D 69/02* (2006.01)
*F16D 13/64* (2006.01)
*F16D 69/04* (2006.01)

(52) U.S. Cl.
CPC ......... *F16D 69/026* (2013.01); *F16D 13/648* (2013.01); *F16D 69/0408* (2013.01);
(Continued)

(58) Field of Classification Search
CPC .. F16D 69/026; F16D 13/648; F16D 69/0408; F16D 2069/0466; F16D 2200/0095
See application file for complete search history.

(56) References Cited

U.S. PATENT DOCUMENTS 3,270,846 A    9/1966   Arledter et al.
3,326,822 A    6/1967   Albertson
(Continued)

FOREIGN PATENT DOCUMENTS

CN    1078297 A    11/1993
CN    1564855      1/2005
(Continued)

OTHER PUBLICATIONS

English language abstract and machine-assisted English translation for JPS 62-285-973 extracted from espacenet.com database on Jul. 22,, 2020, 5 pages.
(Continued)

*Primary Examiner* — Alexander C Kollias
(74) *Attorney, Agent, or Firm* — Howard & Howard Attorneys PLLC

(57) ABSTRACT

A friction material presents a friction generating surface and a bonding surface facing opposite said friction generating surface. The friction material includes structural fibers, friction particles, polyvinyl alcohol fibers, and a resin. A method of forming the friction material is also disclosed. The method comprises the steps of: combining the structural fibers, the friction particles, and the polyvinyl alcohol fibers having an average diameter of less than about 11 μm, an average length of less than about 4 mm, an average denier of less than about 1, to form a substrate material; impregnating the substrate material with the resin; and curing the resin to form the friction material.

19 Claims, 2 Drawing Sheets

(52) U.S. Cl.
CPC .............. *F16D 2069/0466* (2013.01); *F16D 2200/0095* (2013.01)

(56) References Cited

U.S. PATENT DOCUMENTS

| | | | |
|---|---|---|---|
| 3,390,750 | A | 7/1968 | Albertson |
| 3,896,075 | A | 7/1975 | Longley |
| 4,267,016 | A | 5/1981 | Okazaki et al. |
| 4,373,037 | A | 2/1983 | Washabaugh |
| 4,476,256 | A * | 10/1984 | Hamermesh ............ C08K 13/04 523/152 |
| 4,639,390 | A * | 1/1987 | Shoji ...................... D04H 1/54 156/290 |
| 4,743,634 | A | 5/1988 | Royer |
| 4,764,449 | A * | 8/1988 | Vanlseghem ............. B24C 1/04 430/162 |
| 5,110,678 | A | 5/1992 | Narukawa et al. |
| 5,268,398 | A | 12/1993 | Nakagawa et al. |
| 5,474,842 | A | 12/1995 | Hoiness |
| 5,516,816 | A | 5/1996 | Samuels |
| 5,520,866 | A * | 5/1996 | Kaminski ............. F16D 69/026 264/112 |
| 5,573,579 | A | 11/1996 | Nakanishi |
| 5,576,358 | A | 11/1996 | Lem et al. |
| 5,676,577 | A | 10/1997 | Lam et al. |
| 5,707,905 | A | 1/1998 | Lam et al. |
| 5,753,356 | A | 5/1998 | Lam et al. |
| 5,856,244 | A | 1/1999 | Lam et al. |
| 5,858,883 | A | 1/1999 | Lam et al. |
| 5,866,636 | A | 2/1999 | Nitto et al. |
| 5,889,080 | A * | 3/1999 | Kaminski ................ C08J 5/04 523/149 |
| 5,889,082 | A * | 3/1999 | Kaminski ............. F16D 69/026 523/156 |
| 5,958,507 | A | 9/1999 | Lam et al. |
| 5,998,307 | A | 12/1999 | Lam et al. |
| 6,060,536 | A | 5/2000 | Matsumoto et al. |
| 6,086,814 | A | 7/2000 | Krenkel et al. |
| 6,130,176 | A | 10/2000 | Lam |
| 6,630,416 | B1 | 10/2003 | Lam et al. |
| 6,875,711 | B2 | 4/2005 | Chen et al. |
| 7,214,153 | B2 | 5/2007 | Simpson |
| 7,247,361 | B2 | 7/2007 | Dong |
| 7,306,665 | B2 | 12/2007 | Nagayoshi et al. |
| 7,439,418 | B2 | 10/2008 | Mitta et al. |
| 7,537,824 | B2 | 5/2009 | Dong |
| 7,696,261 | B2 | 4/2010 | Lam |
| 7,749,562 | B1 | 7/2010 | Lam et al. |
| 7,806,975 | B2 | 10/2010 | Lam et al. |
| 8,021,744 | B2 | 9/2011 | Lam et al. |
| 8,367,767 | B1 | 2/2013 | Jafri et al. |
| 8,603,614 | B2 | 12/2013 | Lam et al. |
| 8,765,266 | B2 | 7/2014 | Suzuki et al. |
| 9,677,635 | B2 | 6/2017 | Bares et al. |
| 2004/0030000 | A1 | 2/2004 | Takeuchi et al. |
| 2004/0033341 | A1 | 2/2004 | Lam et al. |
| 2004/0043193 | A1 | 3/2004 | Chen et al. |
| 2004/0043243 | A1 | 3/2004 | Chen et al. |
| 2004/0081813 | A1 | 4/2004 | Dong |
| 2004/0247847 | A1 | 12/2004 | Nogayoshi et al. |
| 2005/0064778 | A1 | 3/2005 | Lam et al. |
| 2005/0074595 | A1 | 4/2005 | Lam et al. |
| 2005/0075019 | A1 | 4/2005 | Lam et al. |
| 2005/0075021 | A1 | 4/2005 | Lam et al. |
| 2005/0075022 | A1 | 4/2005 | Lam |
| 2005/0075413 | A1 | 4/2005 | Lam |
| 2005/0075414 | A1 | 4/2005 | Lam et al. |
| 2005/0191477 | A1 | 9/2005 | Dong |
| 2005/0281971 | A1 | 12/2005 | Lam |
| 2006/0008635 | A1 | 1/2006 | Dong et al. |
| 2006/0009541 | A1 | 1/2006 | Chen et al. |
| 2006/0019080 | A1 | 1/2006 | Lam et al. |
| 2006/0019085 | A1 | 1/2006 | Lam et al. |
| 2006/0241207 | A1 | 10/2006 | Lam et al. |
| 2007/0142500 | A1 | 6/2007 | Shao et al. |
| 2008/0125306 | A1 | 5/2008 | Kienzle et al. |
| 2008/0160260 | A1 | 7/2008 | Wada et al. |
| 2008/0184628 | A1 | 8/2008 | Sugai |
| 2009/0048369 | A1 | 2/2009 | Newcomb et al. |
| 2009/0267250 | A1 | 10/2009 | Inada et al. |
| 2009/0324887 | A1 | 12/2009 | McCord et al. |
| 2010/0304631 | A1 | 12/2010 | Dong et al. |
| 2013/0037373 | A1 * | 2/2013 | Dong .................... F16D 69/026 192/107 M |
| 2015/0031787 | A1 | 1/2015 | Bares et al. |

FOREIGN PATENT DOCUMENTS

| | | |
|---|---|---|
| CN | 1564855 | 1/2005 |
| CN | 103451778 | 12/2013 |
| CN | 103451778 A | 12/2013 |
| CN | 103939511 A | 7/2014 |
| EP | 0154488 A2 | 9/1985 |
| EP | 0231098 A2 | 8/1987 |
| EP | 1394438 A1 | 3/2004 |
| EP | 1521001 A2 | 4/2005 |
| EP | 1521007 A2 | 4/2005 |
| EP | 1521001 B1 | 5/2018 |
| GB | 819123 A | 8/1959 |
| JP | S 62-235336 | 10/1987 |
| JP | S62235336 A | 10/1987 |
| JP | S62285973 A | 12/1987 |
| JP | H01224536 A | 9/1989 |
| JP | H08188656 A | 7/1996 |
| JP | H0989025 A | 3/1997 |
| JP | H 09-176983 | 7/1997 |
| JP | H09176983 A | 7/1997 |
| JP | H 10-507732 A | 7/1998 |
| JP | H10507732 A | 7/1998 |
| JP | H 11-500151 | 1/1999 |
| JP | H11500151 A | 1/1999 |
| JP | 2002-348561 A | 12/2002 |
| JP | 2002348561 A | 12/2002 |
| JP | 2003-013043 | 1/2003 |
| JP | 2003013043 A | 1/2003 |
| JP | 2003-073436 | 3/2003 |
| JP | 2003073436 A | 3/2003 |
| JP | 2004-132547 | 4/2004 |
| JP | 2004132547 A | 4/2004 |
| JP | 2005-113130 | 4/2005 |
| JP | 2005113130 A | 4/2005 |
| JP | 2005-121221 | 5/2005 |
| JP | 2005-133074 | 5/2005 |
| JP | 2005121221 A | 5/2005 |
| JP | 2005133074 A | 5/2005 |
| JP | 2006-052845 | 2/2006 |
| JP | 2006052845 A | 2/2006 |
| JP | 2013-032794 | 2/2013 |
| JP | 2013032794 A | 2/2013 |

OTHER PUBLICATIONS

English language abstract and machine-assisted English translation for JPH 01-224536 extracted from espacenet.com database on Jul. 22, 2020, 4 pages.

English language abstract and machine-assisted English translation for JPH 08-188656 extracted from espacenet.com database on Jul. 22, 2020, 6 pages.

English language abstract for JPH 11-500151 extracted from espacenet.com database on Feb. 19, 2020, 1 page.

English language abstract for JP 2013-032794 extracted from espacenet.com database on Feb. 19, 2020, 2 pages.

English language abstract and machine-assisted English translation for CN 1078297 extracted from espacenet.com database on Apr. 30, 2020, 5 pages.

English language abstract and machine-assisted English translation for CN 103939511 extracted from espacenet.com database on Apr. 30, 2020, 7 pages.

English language abstract and machine-assisted English translation for JPH 09-89025 extracted from espacenet.com database on Apr. 30, 2020, 7 pages.

(56) References Cited

OTHER PUBLICATIONS

English Language Abstract of Liu, Zhenyun et al., "Summary of Research on Enhanced Fibers of Automotive Friction Materials", No. 1, Automobile Technology, Jan. 31, 1999, pp. 19-22 and 26, 1 page.
International Search Report for Application No. PCT/US2014/047117, dated Nov. 24, 2014, 3 pages.
International Search Report for Application No.: PCT/US2016/062071 dated Sep. 12, 2017, 3 pages.
English language abstract for CN 1564855 extracted from espacenet.com database on May 16, 2019, 2 pages.
English language abstract and machine-assisted English translation for CN 103451778 extracted from espacenet.com database on May 16, 2019, 17 pages.
English language abstract for JPS 62-235336 extracted from espacenet.com database on May 16, 2019, 1 page.
English language abstract and machine-assisted English translation for JPH 09-176983 extracted from espacenet.com database on May 16, 2019, 13 pages.
English language abstract and machine-assisted English translation for JP 2003-013043 extracted from espacenet.com database on May 16, 2019, 13 pages.
English language abstract and machine-assisted English translation for JP 2003-073436 extracted from espacenet.com database on May 16, 2019, 13 pages.
English language abstract for JP 2004-132547 extracted from espacenet.com database on May 20, 2019, 2 pages.
English language abstract for JP 2005-113130 extracted from espacenet.com database on May 20, 2019, 1 page.
English language abstract for JP 2005-121221 extracted from espacenet.com database on May 20, 2019, 2 pages.
English language abstract for JP 2005-133074 extracted from espacenet.com database on May 20, 2019, 1 page.
English language abstract for JP 2006-052845 extracted from espacenet.com database on May 20, 2019, 1 page.
Dolley, Thomas P., "Diatomite", U.S. Geological Survey Minerals Yearbook, 2000, pp. 25.1-25.4.
Show Me Gold, "Mesh to Micron Conversion Chart", downloaded from: http://www.showmegold.org/news/Mesh.htm on Apr. 2, 2015, pp. 1-2.
English language abstract for JPH 10-507732 A extracted from espacenet.com database on Mar. 1, 2021, 2 pages.
English language abstract and machine-assisted English translation for JP 2002-348561 A extracted from espacenet.com database on Mar. 1, 2021, 10 pages.

\* cited by examiner

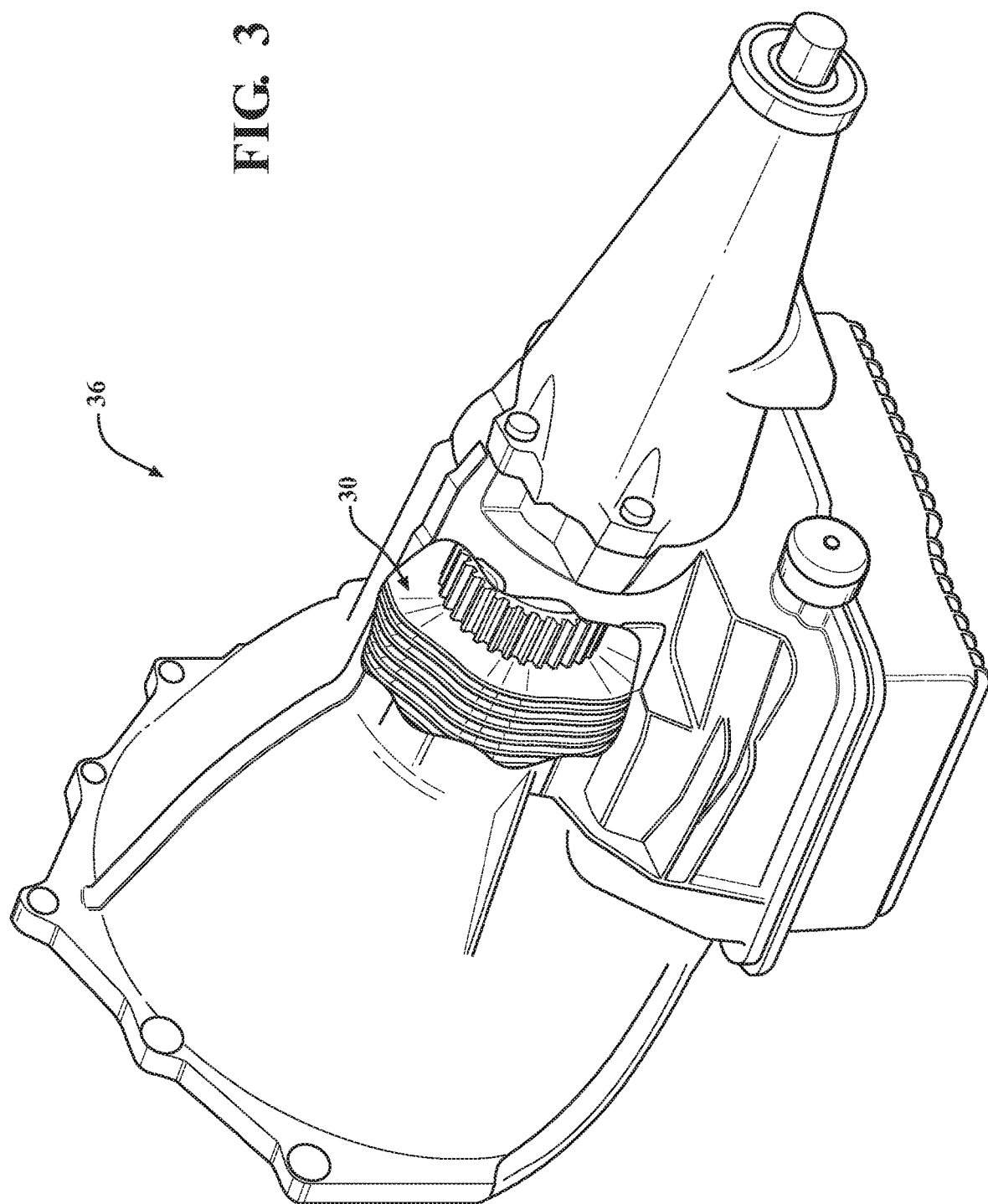

FRICTION MATERIAL

CROSS-REFERENCE TO RELATED APPLICATIONS

The present application is the National Stage of International Patent Application No. PCT/US2016/062071, filed on Nov. 15, 2016, which is hereby expressly incorporated herein by reference in its entirety.

FIELD OF THE DISCLOSURE

The subject disclosure generally relates to a friction material. The friction material can be used in a friction plate in a clutch assembly in a transmission.

DESCRIPTION OF THE RELATED ART

Several components of a motor vehicle powertrain may employ a wet clutch to facilitate the transfer of power from the vehicle's power generator (i.e. an internal combustion engine, electric motor, fuel cell, etc.) to the drive wheels. A transmission located downstream from the power generator which enables vehicle launch, gear shifting, and other torque transfer events is one such component. Some form of a wet clutch may be found throughout many different types of transmissions currently available for motor vehicle operation. A wet clutch may be utilized in a torque converter for an automatic transmission, a multi-plate wet clutch pack for an automatic transmission or a semi-automatic dual-clutch transmission (DCT), and a wet start clutch that may be incorporated into a sportier automatic transmission equipped with as many as seven to nine gears as a substitute for the torque converter, to name but a few exemplary applications. Similar wet clutches may be found elsewhere in the vehicle powertrain besides the transmission.

A wet clutch is an assembly that interlocks two or more opposed, rotating surfaces in the presence of a lubricant by imposing selective interfacial frictional engagement between those surfaces. A friction plate, a band, a synchronizer ring, or some other part that provides one of these engageable rotating surfaces typically supports a friction material to effectuate the intended interlocking frictional engagement. The friction material is typically secured to the engageable rotating surface with an adhesive. The presence of the lubricant at the friction interface cools and reduces wear of the friction material and permits some initial slip to occur so that torque transfer proceeds gradually, although very quickly, in an effort to avoid the discomfort that may accompany an abrupt torque transfer event (i.e. shift shock).

Friction material must function reliably in wet clutch applications, especially the more recent clutch applications such as wet start clutch applications and shifting applications, e.g. semi-automatic DCT applications. That is, the friction material must maintain sufficient performance properties, e.g. coefficient of friction ("COF"), strength, and durability, over a range of conditions. The friction material typically has a porous structure and comprises fibers, particulate fillers, additives, and resin/polymeric binder. The composition of the friction material (e.g. fibers, particulate matter, resin, etc., and amounts thereof) is formulated to optimize the performance properties of the friction material in wet clutch applications. The porous structure of the friction material allows the flow of lubricant through the friction material which cools the friction material which further improves the performance properties and durability of the friction material.

Friction material is produced via a continuous manufacturing process on a manufacturing line. During the continuous manufacturing process, a blend of fibers and particulate matter are combined to form a fibrous web having a desired width and thickness. The fibrous web is moved along the manufacturing line and saturated with resin. Once saturated with resin, the fibrous web is pulled through rollers which compress the fibrous web to desired thickness and squeeze out extra resin to form the friction material. The friction material exits the rollers and is conveyed through a series of ovens which remove solvent and cure the friction material. The friction material, which includes cured resin, is then rolled and typically stored for later use.

Throughout the continuous manufacturing process, the fibrous web/friction material must support itself because it is moved along the manufacturing line (e.g. between belts, rollers, ovens, etc.) while suspended in air in an unsupported manner (e.g. pulled through the air rather than conveyed on a conveyor). However, the composition and porous nature of the fibrous web and the friction material formed therefrom can result in insufficient wet strength and cause the fibrous web and/or the friction material to tear or break which can slow down or even stop the manufacturing process causing quality issues and costly "down time". As such, the desired porosity and composition of the friction material must be balanced with the need for efficient manufacturing.

To this end, friction materials of a certain composition may exhibit improved performance properties in wet clutch applications, but pose manufacturing problems. Likewise, friction materials having increased porosity may exhibit improved performance properties in wet clutch applications, but create manufacturing problems. As such, the formulation and manufacture of friction material often requires balancing performance properties and manufacturability.

Due to the inadequacies of existing friction materials, there remains an opportunity to provide friction material that can be manufactured efficiently and exhibit optimal performance properties.

SUMMARY OF THE DISCLOSURE AND ADVANTAGES

A friction material presenting a friction generating surface and a bonding surface facing opposite said friction generating surface is disclosed. The friction material includes structural fibers, friction particles, polyvinyl alcohol fibers, and a resin. The polyvinyl alcohol fibers are different than the structural fibers.

A method of forming the friction material is also disclosed. The method comprises the steps of: combining the structural fibers, the friction particles, and the polyvinyl alcohol fibers having an average diameter of less than about 11 μm, an average length of less than about 4 mm, an average denier of less than about 1, to form a substrate material; impregnating the substrate material with the resin; and curing the resin to form the friction material.

BRIEF DESCRIPTION OF THE DRAWINGS

Other advantages of the present invention will be readily appreciated, as the same becomes better understood by reference to the following detailed description when considered in connection with the accompanying drawings.

FIG. 3 is a perspective view of a transmission having a cut-out showing a clutch assembly including the friction plate of FIG. 2.

FIGS. 1-3 are exemplary in nature and are not drawn to scale and are, thus, not intended to represent the relative sizes of the various components of the friction material, e.g. the friction adjusting particles, the structural fibers, the polyvinyl alcohol fibers, the pores, etc.

DETAILED DESCRIPTION OF THE DISCLOSURE

Figure 1:
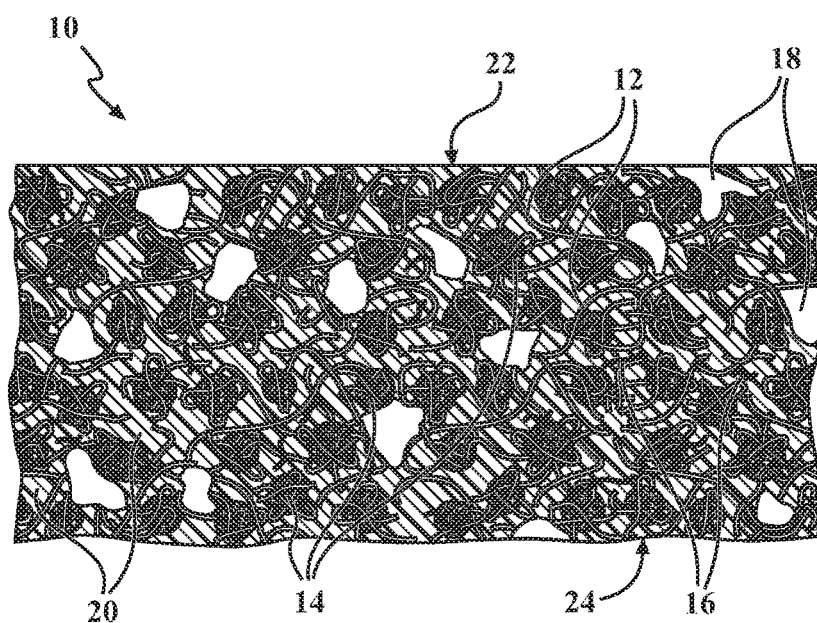
FIG. 1 is an enlarged cross-sectional view of a friction material including uncured resin.

Referring to the Figures, wherein like numerals indicate corresponding parts throughout the several views, a friction material comprising resin is shown generally at 10 and a friction plate including the friction material 10 is shown generally at 30.

The friction material 10 can be manufactured and cured efficiently. Once cured, the friction material 10 is typically used on the friction plate 30 which is included in a wet clutch assembly in a transmission 36 of a motor vehicle. The friction plate 30 includes the friction material 10 and a substrate 32. As is known in the art, the friction material 10 is designed to be adhered to the substrate 32, e.g. a metal plate, to form the friction plate 30. The substrate 32 has two surfaces and the friction material 10 may be adhered to one or both of these surfaces, e.g. with any adhesive known in the art. The friction plate 30 may be used, sold, or provided with a separator plate to form a clutch pack or clutch assembly.

The friction material 10 comprises structural fibers 12, friction particles 14, and polyvinyl alcohol fibers 16. The arrangement of the structural fibers 12, the friction particles 14, and the polyvinyl alcohol fibers 16 typically define a plurality of pores 18. The friction material 10 is typically porous with a resin 20 dispersed throughout. The friction material 10 presents a friction generating surface 22 and a bonding surface 24 facing opposite (and parallel to) the friction generating surface 22. Once the friction material 10 is cured, e.g. exposed to elevated temperatures such that the resin 20 cross-links or cures, the bonding surface 24 is typically adhered to the substrate 32 (e.g. the metal plate) and the friction generating surface 22 is used to generate friction. The structural fibers 12, the friction particles 14, the polyvinyl alcohol fibers 16, and the resin 20 are discussed in greater detail below.

In many embodiments, the friction material 10 comprises the cured product of the structural fibers 12, the friction particles 14, the polyvinyl alcohol fibers 16, and the resin 20. In such embodiments, the polyvinyl alcohol fibers 16 having an average diameter of less than about 11 μm, an average length of less than about 4 mm, and an average denier of less than about 1 are combined with the structural fibers 12 and the friction particles 14 in the presence of water. When combined, the polyvinyl alcohol fibers 16 solubilize and bind the structural fibers 12 and the friction particles 14. In a typical embodiment, the polyvinyl alcohol fibers 16 are combined with the structural fibers 12 and the friction particles 14 with a certain diameter, length, denier, and other properties (which are described throughout this disclosure) but these properties may change during formation of the friction material 10 due to the solubilization, folding, etc. of the polyvinyl alcohol fibers 16 during processing. Of course, without being bound by theory, it is believed that the solubilization of the polyvinyl alcohol fibers 16 provides flexibility which allows for the polyvinyl alcohol fibers 16 to act as a binder and also provides a plurality of pores 18 having larger size. Structural fibers:

The friction material 10 includes structural fibers 12. The structural fibers 12 may be alternatively described as a plurality of structural fibers 12. In various embodiments, the structural fibers 12 are present in the friction material 10 in an amount of from about 1 to about 300, alternatively from about 2 to about 250, alternatively from about 2 to about 150, alternatively from about 10 to about 150, alternatively from about 10 to about 120, lbs per 3000 ft$^2$ of the a friction generating surface 22. In additional non-limiting embodiments, all values and ranges of values within and including the aforementioned range endpoints are hereby expressly contemplated.

Notably, the amount of the components in the friction material 10 provided herein are in units of pounds per 3000 ft$^2$, such units are customarily used in the material making industry as a measurement of weight based on a given surface area of a thin layer, whether impregnated with the resin 20 or not.

Alternatively, in various embodiments, the structural fibers 12 are present in the friction material 10 in an amount of from 10 weight percent to less than 95 weight percent, based on a total weight of the friction material 10 (without resin). In various embodiments, the structural fibers 12 are present in an amount of from about 14 to about 89, alternatively from about 34 to about 79, alternatively from about 44 to about 74, alternatively from about 61 to about 69, weight percent based on a total weight of the friction material 10 (without resin). In additional non-limiting embodiments, all values and ranges of values within and including the aforementioned range endpoints are hereby expressly contemplated.

The amount of the structural fibers 12 present in the friction material 10 may vary outside of the ranges above, but is typically both whole and fractional values within these ranges. Further, it is to be appreciated that more than one type of the structural fibers 12 may be included in the friction material 10, in which case the total amount of all the structural fibers 12 present in the friction material 10 is within the above ranges.

The structural fibers 12 are not particularly limited in type and may be chosen from acrylic fibers, aramid fibers, cellulose fibers, carbon fibers, and combinations thereof. The structural fibers 12 may be woven, non-woven, or any other suitable construction. In various embodiments, the structural fibers 12 of the friction material 10 are, include, comprise, consist essentially of, or consist of, acrylic fibers, aramid fibers, cellulose fibers, carbon fibers, and combinations thereof. All weight ranges and ratios of the various combinations of the aforementioned fiber types are hereby expressly contemplated in various non-limiting embodiments.

In various embodiments, the structural fibers 12 may be further defined as, being, including, comprising, consisting essentially of, or consisting of any of those described above, e.g. AB homopolymers, AABB polymers, etc. Relative to aramid fibers, as is known in the art, aramids are generally prepared by the reaction between an amine group and a carboxylic acid halide group. Simple AB homopolymers may look like $nN_{H2}$—Ar—COCl→—(NH—Ar—CO)$_n$—+ nHCl. Various non-limiting examples of aramids include Kevlar, Twaron, Nomex, New Star and Teijinconex, which are AABB polymers. Nomex, Teijinconex and New Star include predominantly meta-linkages and are poly-metaphenylene isophthalamides (MPIA). Kevlar and Twaron are both p-phenylene terephthalamides (PPTA), the simplest form of the AABB para-polyaramide. PPTA is a product of p-phenylene diamine (PPD) and terephthaloyl dichloride (TDC or TCl). One or more types of aramids can be used. In one embodiment, the aramid is poly-paraphenylene terephthalamide. In another embodiment, the aramid is or includes two or more types of aramids, e.g. a first poly-paraphenylene terephthalamide and a second poly-paraphenylene terephthalamide that is different from the first. In one embodiment, Twaron products are used. In other embodiments, Kevlar is used. In still other embodiments, other aramids are used.

In certain embodiments, the presence of carbon fibers aids in increasing thermal resistance, maintaining a steady coefficient of friction and increasing the squeal resistance. Carbon fibers can provide good heat conduction such that the friction material 10 has a desired heat resistance. In other embodiments, the use of aramid fibers and carbon fibers improves the ability of the friction material 10 to withstand high temperatures.

In other embodiments, the cellulose fibers contribute to surface smoothness of the friction material 10, thereby making the friction material 10 more stable during operation. In certain embodiments the cellulose fibers include fibers that have a flat and wide surface. The flat, wide cellulose fibers can retain more friction adjusting agent on the surface of the individual fibers making up the friction material 10. In some embodiments, cellulose fibers that are derived from wood are used such as birch fibers and/or eucalyptus fibers. The cellulose fibers can also improve the friction material's "break-in" characteristics at an economical cost.

In further embodiments, cotton fibers aid in providing shear strength to the friction material 10. The cotton fibers typically have fibrillated strands attached to a main fiber core and aid in preventing delamination of the friction material 10 during use. In still other embodiments, the acrylic fibers may be, or be formed from, one or more synthetic acrylic polymers such as those formed from at least 85% by weight acrylonitrile monomers.

In a preferred embodiment, the friction material 10 includes aramid fiber and carbon fiber. In various embodiments, when two or more types of structural fibers 12 are used, each of the structural fibers 12 may be present in any amount from about 1 to about 99 weight percent based on a total combined weight of the structural fibers 12, so long as the total weight of all structural fibers 12 used is from about 20 to about 80 weight percent, based on a total weight of the friction material 10. For example, any one or more individual structural fibers 12 may be utilized in an amount of about 1, about 5, about 10, about 15, about 20, about 25, about 30, about 35, about 40, about 45, about 50, about 55, about 60, about 65, about 70, about 75, or about 80, weight percent based on a total combined weight of the structural fibers 12. In some embodiments, two types of the structural fibers 12 are used wherein a first type of fiber is used in an amount of from about 50 to about 95, alternatively about 60 to about 90, alternatively about 70 to about 90, alternatively about 75 to about 85, alternatively about 10 to about 50, alternatively about 10 to about 40, alternatively about 10 to about 30, alternatively about 15 to about 25, weight percent based on a total combined weight of the structural fibers 12, and a second type of fiber is used in a balance amount such that the total weight percent of the structural fibers 12 is from 20 to 80 weight percent, based on a total weight of the friction material 10, as described above. In additional non-limiting embodiments, all values and ranges of values within and including the aforementioned range endpoints are hereby expressly contemplated.

In various embodiments, the structural fibers 12 have average diameters of from about 1 to about 500, alternatively from about 2 to about 80, alternatively from about 2 to about 60, μm, and average lengths of from about 1 to about 20, alternatively from about 2 to about 20, alternatively from about 2 to about 15, alternatively from about 2 to about 10, alternatively from about 2 to about 8, alternatively from about 4 to about 6, mm. In additional non-limiting embodiments, all values and ranges of values within and including the aforementioned range endpoints are hereby expressly contemplated. In such embodiments, the structural fibers 12 typically have a degree of fibrillation as measured according to Canadian Standard Freeness ("CSF") of from about 5 to about 650, alternatively from about 5 to about 300, alternatively from about 10 to about 200, alternatively from about 10 to about 100, ml CSF. In additional non-limiting embodiments, all values and ranges of values within and including the aforementioned range endpoints are hereby expressly contemplated. CSF is an empirical test procedure that measures the rate at which 3 grams of a fibrous pulp material in 1 liter of water may be drained. CSF measurements are conducted in accordance with the TAPPI T227 test procedure. In making CSF measurements, it is noted that a more fibrillated fibrous pulp material will have a lower water drainage rate and, thus, a lower "ml CSF" value, and that a less fibrillated fibrous pulp material will have a higher "ml CSF" value.

Friction material 10 including structural fibers 12 having a CSF from about 430 to about 650 can provide superior friction performance and have better material properties than friction material 10 including more fibrillated structural fibers 12. Longer fiber length, together with high Canadian Standard Freeness, tend to provide a friction material 10 with high porosity and good wear resistance. Less fibrillated structural fibers 12 (CSF of about 530 to about 650) may exhibit good long-term durability and stable coefficients of friction. In additional non-limiting embodiments, all values and ranges of values within and including the aforementioned range endpoints are hereby expressly contemplated.

Further, in various embodiments, the structural fibers 12 have a thermal stability of about 200° C. or greater, alternatively 250° C. or greater, alternatively 350° C. or greater. By thermal stability it is meant that the structural fibers 12 do not melt, soften, or decompose. The thermal stability of the structural fibers 12 is typically determined by TGA. The temperature at which a test sample of the elastomeric particles analyzed via TGA loses 5 weight percent based on a total weight of the test sample is the temperature at which the elastomeric particles lose thermal stability.

Friction Particles:

The friction material 10 includes the friction particles 14. The friction particles 14 may be alternatively described as a plurality of friction particles 14.

In various embodiments, the friction particles 14 are present in the friction material 10 in an amount of from about 1 to about 300, alternatively from about 2 to about 200, alternatively from about 10 to about 100 alternatively from about 15 to about 80 lbs per 3000 ft$^2$ of the friction generating surface 22. In additional non-limiting embodiments, all values and ranges of values within and including the aforementioned range endpoints are hereby expressly contemplated.

Alternatively, in various embodiments, the friction particles 14 are present in the friction material 10 in an amount of from 10 weight percent to less than 85 weight percent, based on a total weight of the friction material 10 (without resin). In various embodiments, the friction particles 14 are present in an amount of from about 15 to about 75, alternatively from about 15 to about 70, alternatively from about 15 to about 65, alternatively from about 20 to about 60, alternatively from about 21 to about 39, alternatively from about 31 to about 39, weight percent based on a total weight of the friction material 10 (without resin). In additional non-limiting embodiments, all values and ranges of values within and including the aforementioned range endpoints are hereby expressly contemplated.

The amount of the friction particles 14 present in the friction material 10 may vary outside of the ranges above, but is typically both whole and fractional values within these ranges. Further, it is to be appreciated that more than one type of friction particle may be included in the friction material 10, in which case the total amount of all the friction particles 14 present in the friction material 10 is within the above ranges.

The friction particles 14 are not particularly limited in type and may be chosen from silica, diatomaceous earth, graphite, and combinations thereof. The friction particles 14 may be reinforcing or non-reinforcing. In various embodiments, the friction particles 14 of the friction material 10 are, include, comprise, consist essentially of, or consist of, silica, diatomaceous earth, graphite, and combinations thereof. In various embodiments, the friction particles 14 are diatomaceous earth. The friction particles 14 may be free of silica. All weight ranges and ratios of the various combinations of the aforementioned friction particle types are hereby expressly contemplated in various non-limiting embodiments. For example, such an embodiment may include graphite but be free of silica and/or diatomaceous earth.

In other embodiments, the friction particles 14 are, include, consists essentially of, or consists of silica, carbon, graphite, alumina, magnesia, calcium oxide, titania, ceria, zirconia, cordierite, mullite, sillimanite, spodumene, petalite, zircon, silicon carbide, titanium carbide, boron carbide, hafnium carbide, silicon nitride, titanium nitride, titanium boride, cashew nut, rubber, and combinations thereof.

In various embodiments, the friction particles 14 are, include, consist essentially of, or consists of, diatomaceous earth. Diatomaceous earth is a mineral including silica. In some such embodiments, the diatomaceous earth has an average diameter of from about 0.1 μm to about 30 μm and a Mohs hardness of from about 3 to about 9. Of course, all of the particles of the friction particles 14 may be diatomaceous earth or, alternatively, may include a combination of different types of particles such as various combinations of diatomaceous earth, carbon, graphite, and alumina. The type or types of friction particles 14 may vary depending on the physical characteristics sought.

In various embodiments, the friction material 10 includes diatomaceous earth, either as part of the friction particles 14 or independently therefrom. For example, in some embodiments, the friction material 10 may further include diatomaceous earth in an amount of up to about 50 weight percent based on a total weight of the friction material 10 (without resin). If the diatomaceous earth is included, it will be included in an amount of greater than zero and typically less than about 40, weight percent based on a total weight of the friction material 10. In various embodiments, the diatomaceous earth is present in an amount of from about 1 to about 80, alternatively about 2 to about 70, alternatively about 3 to about 60, alternatively about 4 to about 50, alternatively about 5 to about 40, alternatively about 10 to about 30, alternatively about 15 to about 25, weight percent based on a total weight of the friction material 10 (without resin). In additional non-limiting embodiments, all values and ranges of values within and including the aforementioned range endpoints are hereby expressly contemplated.

A secondary, or top, layer of friction particles may also be deposited on the friction generating surface 22 of the friction material 10. Various friction modifying particles, including diatomaceous earth, are useful as the secondary layer on the fibrous base material. In some embodiments, any combination of the friction modifying particles described above, can be uniformly deposited on the friction generating surface 22 of the friction material 10 in an amount of from about 0.2 to about 20, alternatively about 2 to about 10, alternatively about 3 to about 5, weight percent based on a total weight of the friction material 10 (without resin). In additional non-limiting embodiments, all values and ranges of values within and including the aforementioned range endpoints are hereby expressly contemplated.

In other embodiments, the diatomaceous earth is included in any amount that is described above relative to the friction particles 14, e.g. in an amount of from about 5 to about 100, alternatively about 10 to about 50, alternatively about 10 to about 30, alternatively about 15 to about 25, weight percent based on a total weight of the friction particles 14 in the friction material 10. In other words, the diatomaceous earth can be the friction particles 14 and thereby be present in any amount described above in which the friction particles 14 can be present. In additional non-limiting embodiments, all values and ranges of values within and including the aforementioned range endpoints are hereby expressly contemplated. The terminology "consists essentially of" may describe embodiments that include one or more of the aforementioned friction particles 14 and that are simultaneously free of one or more of the aforementioned friction particles 14.

In various embodiments, the friction material 10 includes graphite, either as part of the friction particles 14 or independently therefrom. For example, in some embodiments, the friction material 10 may further include graphite in an amount of up to about 20 weight percent based on a total weight of the friction material 10. If the graphite is included, it will be included in an amount of greater than zero and typically less than about 20, weight percent based on a total weight of the friction material 10. In various embodiments, the graphite is present in an amount of from 1 to 20, 2 to 19, 3 to 18, 4 to 17, 5 to 16, 6 to 15, 7 to 14, 8 to 13, 9 to 12, 10 to 11, 5 to 10, 5 to 15, 5 to 19, 10 to 15, 10 to 19, or 15 to 19, weight percent based on a total weight of the friction material 10. In additional non-limiting embodiments, all values and ranges of values within and including the aforementioned range endpoints are hereby expressly contemplated.

In other embodiments, the graphite is included in any amount that is described above relative to the friction particles 14, e.g. in an amount of from about 31 to about 49, 32 to 48, 33 to 47, 34 to 46, 35 to 45, 36 to 44, 37 to 43, 38 to 42, 39 to 41, 30 to 45, 30 to 40, 30 to 35, 35 to 49, 35 to 45, 35 to 40, 40 to 49, 40 to 45, or 45 to 49, weight percent based on a total weight of the friction material 10. In other words, the graphite can be the friction particles 14 and thereby be present in any amount described above in which the friction particles 14 can be present. In additional non-limiting embodiments, all values and ranges of values within and including the aforementioned range endpoints are hereby expressly contemplated. The terminology "consists essentially of" may describe embodiments that include one or more of the aforementioned friction particles 14 and that are simultaneously free of one or more of the aforementioned friction particles 14.

In various embodiments, the friction particles 14 include particles derived from cashew nut shell oil, rubber, or combinations thereof. Friction particles 14 derived from cashew nut shell oil or comprising rubber are elastic and exhibit rubber-like properties. In this disclosure, friction particles 14 derived from cashew nut shell oil and/or rubber may also be referred to as elastomeric particles.

In some embodiments, the friction particles 14 include rubber particles which are, comprise, consist essentially of, or consist of, silicone rubber, styrene butadiene rubber ("SBR"), butyl rubber, halogenated rubbers (e.g. chlorobutyl rubber, bromobutyl rubber, polychloroprene rubber, nitrile rubber), and combinations thereof.

In various embodiments, the friction particles 14 have an average diameter of from about 0.04 µm to about 40 µm, alternatively from about 1 µm to about 20 µm. In additional non-limiting embodiments, all values and ranges of values within and including the aforementioned range endpoints are hereby expressly contemplated. Further, in various embodiments, the friction particles 14 have a thermal stability of about 400° C. or greater, alternatively about 450° C. or greater, alternatively about 500° C. or greater. By thermal stability it is meant that the friction particles 14 do not melt, soften, or decompose. The thermal stability of the friction particles 14 is typically determined by thermal gravimetric analysis ("TGA"). The temperature at which a test sample of the friction particles 14 analyzed via TGA loses 10 weight percent based on a total weight of the test sample is the temperature at which the friction particles 14 lose thermal stability.

The friction particles 14 affect the pore size of the friction material 10 and may also affect elasticity/compression, each described in greater detail below. For example, when the size of individual particles of the friction particles 14 is larger, the particles do not pack together as tightly when the friction material 10 is formed. This tends to lead to the formation of larger pore sizes. Conversely, when the size of the individual particles of the friction particles 14 is smaller, the particles pack together more tightly when the friction material 10 is formed. This tends to lead to the formation of smaller pore sizes.

Polyvinyl Alcohol Fibers:

The friction material 10 includes polyvinyl alcohol fibers 16. The polyvinyl alcohol fibers 16 may be alternatively described as a plurality of polyvinyl alcohol fibers 16. In various embodiments, the polyvinyl alcohol fibers 16 are present in the friction material 10 in an amount of from about 1 to about 50, alternatively from about 2 to about 25, alternatively from about 2 to about 15, lbs per 3000 ft² of the a friction generating surface 22. In additional non-limiting embodiments, all values and ranges of values within and including the aforementioned range endpoints are hereby expressly contemplated.

Alternatively, in various embodiments, the polyvinyl alcohol fibers 16 are present in the friction material 10 in an amount of from 1 weight percent to less than 50 weight percent, based on a total weight of the friction material 10 (without resin). In various embodiments, the polyvinyl alcohol fibers 16 are present in an amount of from about 1 to about 19, alternatively from about 1 to about 14, alternatively from about 1 to about 9, alternatively from about 1 to about 4, weight percent based on a total weight of the friction material 10 (without resin). In additional non-limiting embodiments, all values and ranges of values within and including the aforementioned range endpoints are hereby expressly contemplated.

The amount of the polyvinyl alcohol fibers 16 present in the friction material 10 may vary outside of the ranges above, but is typically both whole and fractional values within these ranges. Further, it is to be appreciated that more than one type of the polyvinyl alcohol fibers 16 may be included in the friction material 10, in which case the total amount of all the polyvinyl alcohol fibers 16 present in the friction material 10 is within the above ranges.

The polyvinyl alcohol fibers 16 include polyvinyl alcohol. Polyvinyl alcohols are commercially available, or they can be made by polymerizing a vinyl acetate monomer. It is contemplated that the polyvinyl alcohol may be prepared by polymerization of a corresponding monomer. In many embodiments, the polyvinyl alcohol is not prepared by polymerization of a corresponding monomer. Instead, the monomer, vinyl alcohol, typically exists in a tautomeric form, acetaldehyde. Accordingly, polyvinyl alcohol is typically prepared by partial or complete hydrolysis (e.g. saponification) of polyvinyl acetate to remove acetate groups. In this disclosure, the polyvinyl alcohol may have any degree, percent, or amount of hydrolysis. In various embodiments, the polyvinyl alcohol has a percentage of hydrolysis of (at least) 50, 55, 60, 65, 70, 75, 80, 85, 90, 95, 96, 97, 98, or 99, mol %. The polyvinyl alcohol may also be completely, e.g. 100 mol %, hydrolyzed.

In various embodiments, the polyvinyl alcohol has a number average molecular weight ($M_n$) of from about 2,000 to about 800,000, alternatively from about 5,000 to about 450,000, alternatively from about 10,000 to about 300,000, alternatively from about 15,000 to about 200,000, alternatively from about 20,000 to about 200,000, alternatively from about 25,000 to about 200,000, alternatively from about 30,000 to about 200,000, alternatively from about 35,000 to about 200,000, alternatively from about 40,000 to about 200,000, alternatively from about 45,000 to about 200,000, alternatively from about 50,000 to about 200,000, alternatively from about 55,000 to about 200,000, alternatively from about 60,000 to about 200,000, alternatively from about 60,000 to about 120,000, g/mol. In other embodiments, the polyvinyl alcohol has an $M_n$ of from about 70,000 to about 190,000, alternatively from about 80,000 to about 180,000, alternatively from about 90,000 to about 170,000, alternatively from about 100,000 to about 160,000, alternatively from about 110,000 to about 150,000, alternatively from about 120,000 to about 140,000, alternatively from about 130,000 to about 140,000, g/mol. In still other embodiments, the polyvinyl alcohol has an $M_n$ of less than about 85,000 g/mol or from about 60,000 to less than about 85,000 g/mol. It is contemplated that the molecular weight may be any value, or range of values, both whole and fractional, within or between any one or more values described above. In various embodiments, any one or more of the aforementioned molecular weights may vary by ±1, 2, 3, 4, 5, 6, 7, 8, 9, or 10, %.

In various embodiments, the polyvinyl alcohol fibers 16 are soluble in water at a temperature of 60° C. or greater. The solubility of the polyvinyl alcohol fibers 16 are believed to improve the "wet strength" of the friction material 10. The increased wet strength of the friction material 10 allows for the optimization of the components included in the material and also allows for efficient manufacturing. The wet strength of the friction material 10 before resin addition is evaluated by test method ASTM D 828-97.

In many embodiments, the polyvinyl alcohol fibers 16 have an average diameter of less than about 11 µm, an average length of less than about 4 mm, and an average denier of less than about 1. In various embodiments, the polyvinyl alcohol fibers 16 have: an average diameter of less than about 11, from about 1 to about 11, alternatively from about 2 to about 10, alternatively from about 3 to about 9, alternatively from about 5 to about 7, alternatively about 6, μm; an average length of from about 0.5 to about 3.9, alternatively from about 1 to about 3.9, alternatively from about 2 to about 3.9, alternatively from about 2 to about 3.5, alternatively from about 2.5 to about 3.5, mm; and/or an average denier of less than about 1, alternatively from about 0.2 to about 0.9.

In some embodiments, the polyvinyl alcohol fibers 16 have an average aspect ratio of greater than about 2 μm, and an average diameter of less than about 11 μm. Of course, the polyvinyl alcohol fibers 16 can include polyvinyl alcohol fibers with the same or different characteristics (e.g. fibers of $M_n$, diameter, length, and denier). In some embodiments, the friction material 10 includes polyvinyl alcohol fibers 16 and polyvinyl alcohol particles. In such embodiments, the friction material 10 may further include polyvinyl alcohol particles having an average aspect ratio of less than about 2 μm. Of course, the friction material 10 can include polyvinyl alcohol particles with the same or different characteristics, e.g. polyvinyl alcohol particles of different diameters and aspect ratios).

Resin:

The friction material 10 includes the resin 20 (which can be cured or uncured). The resin 20 may is also referred to in the art as binder. The terminology "substrate material" describes embodiments of the friction material 10 that are free of the resin.

In various embodiments, the resin 20 is present in the friction material 10 in an amount of less than about 300, alternatively less than about 250, alternatively less than about 200, alternatively less than about 150, alternatively less than about 100, alternatively less than about 75, alternatively less than about 60, alternatively less than about 55, alternatively less than about 45, alternatively less than about 40, alternatively less than about 40, alternatively from about 40 to about 55, alternatively from about 20 to about 35, alternatively from about 25 to about 30, weight percent based on a total weight of the friction material 10. This amount is sometimes described as resin "pick up." In additional non-limiting embodiments, all values and ranges of values within and including the aforementioned range endpoints are hereby expressly contemplated. The amount of the resin 20 present in the friction material 10 may vary outside of the ranges above, but is typically both whole and fractional values within these ranges. Further, it is to be appreciated that more than one type of the resin 20 may be included in the friction material 10, in which case the total amount of the resin 20 present in the friction material 10 is within the above ranges. The resin 20 is disposed or dispersed throughout the friction material 10. In other words, the resin 20 may be dispersed homogeneously or heterogeneously throughout the friction material 10. In various embodiments, the resin 20 may partially or wholly encapsulate the fiber(s), friction particle(s), and/or the polyvinyl alcohol fibers 16.

In various embodiments, depending on the stage of formation of the friction material 10, the resin 20 may be not cured at all, partially cured, or less than entirely cured. In other words, the resin 20 may be cured, uncured, or partially cured, depending on which stage of the manufacturing process is reviewed. In a typical embodiment, the resin is cured thermally (e.g. via a high temperature bake). Once cured, the resin 20 confers strength and rigidity to the friction material 10 and adheres the fibers, friction particles 14, etc., while maintaining a desired porosity for proper lubricant flow and retention. It should also be understood when the friction material 10 is described as "cured" or as comprising a "reaction product," the friction material comprises cured resin.

Referring now to the resin 20 that is dispersed throughout the friction material 10. The resin 20 may be any thermosetting resin suitable for providing structural strength to the friction material 10. The resin 20 may, for example, be a phenolic resin or a modified phenolic resin (e.g. an epoxy phenolic, etc.). A phenolic resin is a class of thermosetting resins that is produced by the condensation of an aromatic alcohol, typically a phenol, and an aldehyde, typically a formaldehyde. A phenolic-based resin is a thermosetting resin blend that includes at least 50 weight percent of a phenolic resin based on the total weight of all resins and excluding any solvents or processing acids. Some examples of other thermosetting resins that may be blended with a phenolic resin include silicone resins, epoxy resins, and polybutadiene resins, to name but a few examples. That is, various phenolic-based resins may include modifying ingredients, such as silicone, epoxy, butadiene, tung oil, benzene, cashew nut oil and the like. In phenolic-modified resins, the phenolic resin is generally present at 50% or greater by weight (excluding any solvents present). However, in one or more embodiments, the resin 20 may include, for example, 5 to 80%, by weight of a silicone resin based on the weight of the mixture of the silicone-phenolic resin mixture (excluding solvents and other processing acids). Examples of phenolic and phenolic-silicone resins that may be used are described in U.S. Pat. No. 5,998,307, which is expressly incorporated herein in its entirety in various non-limiting embodiments.

Silicone resins that may be used may include thermal curing silicone sealants and silicone rubbers. Various silicone resins may also be used such as those that include xylene and acetylacetone (2,4-pentanedione). In still other embodiments, an epoxy modified phenolic resin which includes 5 to 25 percent, by weight of an epoxy compound with the remainder (excluding solvents and other processing aids) phenolic resin, may also be used.

Additives:

The friction material 10 may also include 1 or more additives. Such additives can be chosen from the group of anti-foaming agents, processing additives, plasticizers, surface-active agents, adhesion promoters, flame retardants, anti-oxidants, water scavengers, colorants, dyes, ultraviolet light stabilizers, fillers, thixotropic agents, blowing agents, surfactants, inert diluents, and combinations thereof. The additive(s) may be included in any amount as desired by those of skill in the art.

The Friction Material:

Referring now to FIG. 1, the friction material 10 comprises structural fibers 12, friction particles 14, polyvinyl alcohol fibers 16, and resin 20. The arrangement of the structural fibers 12, the friction particles 14, and the polyvinyl alcohol fibers 16 typically define a plurality of pores 18. The friction material 10 is typically porous and may or may not include the resin 20 dispersed throughout. For purposes of the present disclosure, the friction material 10 includes resin (cured or uncured). As is disclosed above, materials 10 which include structural fibers 12, friction particles 14, polyvinyl alcohol fibers 16 but do not include resin 20 are referred to as the substrate material. Once the curable resin of the friction material 10 is cured, the friction material 10 is fit for use, e.g. on a friction plate 30.

The friction material 10 presents the friction generating surface 22 and the bonding surface 24 facing opposite (and parallel to) the friction generating surface 22. The bonding surface 24 is typically adhered to the substrate 32 (e.g. the metal plate) and the friction generating surface 22 is used to generate friction.

The friction material 10 may be described as single-ply, meaning that it is a single layer and is not two (2)-ply. In other words, the friction material 10 does not include two distinct layers as would be present in a two-ply structure. However, the friction material 10 may be described as including a base and a deposit.

The friction material 10 typically defines pores 18, e.g. a plurality of pores 18. Each of the pores 18 has a pore size. The average, or mean, pore size is typically represented as a distribution. The pore size may be determined using ASTM D4404-10. In various embodiments, the median pore size is, or alternatively the range of all pore sizes in the friction material 10 is, from 0.5 µm to 50 µm, 1 µm to 50 µm, 5 µm to 50 µm, 10 µm to 45 µm, 15 µm to 40 µm, 20 µm to 35 µm, 25 µm to 30 µm, 30 µm to 35 µm, 5 µm to 15 µm, 5 µm to 10 µm, 10 µm to 15 µm, 10 µm to 20 µm, 5 µm to 20 µm, 5 µm to 7 µm, 7 µm to 10 µm, or 7 µm to 15 µm, as determined using ASTM D4404-10. In additional non-limiting embodiments, all values and ranges of values within and including the aforementioned range endpoints are hereby expressly contemplated.

In other embodiments, the friction material 10 has a porosity of from 25% to 85% as determined using ASTM D4404-10. The porosity of the friction material 10 can be alternatively described as a percentage of the total friction material 10 that is open to air or the percentage of the total friction material 10, based on volume, that is air or not solid. In various embodiments, the friction material 10 has a porosity of from 25 to 80, 35 to 80, 25 to 70, 35 to 70, 45 to 85, 45 to 75, 55 to 85, 55 to 75, 60 to 80, 60 to 75, 60 to 70, 60 to 65, 65 to 85, 65 to 75, 65 to 70, 70 to 85, 70 to 80, 70 to 75, 75 to 85, 75 to 80, or 80 to 85, %, as determined using ASTM D4404-10. In still other embodiments, the friction material 10 has a porosity of 60, 61, 62, 63, 64, 65, 66, 67, 78, 69, or 70, %, as determined using ASTM D4404-10. In additional non-limiting embodiments, all values and ranges of values within and including the aforementioned range endpoints are hereby expressly contemplated.

The more porous the structure of the friction material 10, the more efficiently heat is dissipated. The oil flow in and out of the friction material 10 during engagement of the friction material 10 during use occurs more rapidly when the friction material 10 is porous. For example, when the friction material 10 has a higher mean flow pore diameter and porosity, the friction material 10 is more likely to run cooler or with less heat generated in a transmission 36 due to better automatic transmission 36 fluid flow throughout the pores 18 of the friction material 10. During operation of a transmission 36 system, oil deposits on the friction material 10 tend to develop over time due to a breakdown of automatic transmission fluid, especially at high temperatures. The oil deposits tend to decrease the size of the pores 18. Therefore, when the friction material 10 is formed with larger pores 18, the greater the remaining/resultant pore size after oil deposit. Porosity of the friction material 10 may be further modified based on choice of the fibers, resin, filler, filler particle size, and substrate material weight.

In various embodiments, the friction material 10 may have high porosity such that there is a high fluid permeation capacity during use. In such embodiments, it may be important that the friction material 10 not only be porous, but also be compressible. For example, the fluids permeated into the friction material 10 typically must be capable of being squeezed or released from the friction material 10 quickly under the pressures applied during operation of the transmission 36, yet the friction material 10 typically must not collapse. It may also be important that the friction material 10 have high thermal conductivity to also help rapidly dissipate the heat generated during operation of the transmission 36.

In various embodiments, the friction material 10 has a density of from about 0.4 to about 1.5, alternatively from about 0.4 to about 1.0, alternatively from about 0.4 to about 1.0, alternatively about 0.4 to about 0.8, $g/cm^3$, alternatively from about 0.5 to about 0.8, $g/cm^3$. In such embodiments, the total thickness of the friction material 10 is typically from about 0.3 to about 1, e.g. 0.3 to 0.9, 0.4 to 0.8, 0.5 to 0.7, 0.6 to 0.7, less than 0.5 mm, alternatively from about 0.3 mm to about 5 mm, alternatively about 0.3 mm to 3 mm, alternatively about 0.3 mm to about 2 mm, alternatively about 0.31 to about 0.39, alternatively about 0.32 to about 0.38, alternatively about 0.33 to about 0.37, alternatively about 0.34 to about 0.36, alternatively about 0.34, mm. In additional non-limiting embodiments, all values and ranges of values within and including the aforementioned range endpoints are hereby expressly contemplated. This thickness may refer to a thickness prior to, or after, inclusion of the resin.

In various embodiments, the friction material 10 typically has a wet tensile strength (before resin addition, with greater than 10 percent by weight water) of greater than about 3,000, alternatively greater than about 3,250, alternatively greater than about 3,500, alternatively from about 3,500 to about 8,000, alternatively from about 3,800 to about 8,000, g/in when tested in accordance with ASTM D828-97. With respect to ASTM D828-97, 1 inch wide by 10 inch long samples of friction material 10, are pulled at a rate of 1 in/min.

In various embodiments, the friction material 10 (before resin addition) typically has a dry tensile strength (with less than 2 percent by weight water) of greater than about 3,500, greater than about 4,000, greater than about 4,500, greater than about 5,000, alternatively greater than about 5,200, alternatively from about 3,000 to about 8,000, alternatively from about 3,500 to about 7,000, alternatively from about 4,800 to about 10,000, alternatively from about 5,000 to about 9,000, g/in when tested in accordance with ASTM D828-97. With respect to ASTM D828-97, 1 inch wide by 10 inch long samples of friction material 10, are pulled at a rate of 1 in/min.

Without being bound by theory, it is believed that the polyvinyl alcohol fibers 16 provide additional strength when it is dry, especially in fibrous form, and dissolves when wet to act as an intermediate binder which holds the friction material 10 together during processing prior to curing.

In various embodiments, the friction material 10 exhibits improved anti-shudder characteristics along with improved elasticity/compression and/or porosity which allows for more uniform heat dissipation during use. Fluids in transmissions can rapidly move through the pores 18 of the friction material 10. Further, improved elasticity/compression and/or porosity provides more uniform pressure or even pressure distribution on the friction material 10 such that uneven lining wear or "hot spots" are minimized.

In still other embodiments, the friction material 10 has a compression of from 6 to 8, from 6 to 7, or from 7 to 8, percent, at 2 MPa. Compression is a material property of the friction material 10 that may be measured when the friction material 10 is disposed on the metal plate (i.e., measured when part of the friction plate 30, below) or when the friction material 10 is not disposed on the metal plate. Typically, compression is a measurement of a distance (e.g. mm) that the friction material 10 is compressed under a certain load. For example, a thickness of the friction material 10 before a load is applied can be measured. Then, the load may be applied.

Subsequently, the new thickness of the friction material 10 after the load is applied for a certain time period is then measured. The new thickness is measured when the friction material 10 is under the load. The compression is different than the bounce-back/rebound properties of the friction material 10. Typically, the compression is reported as a ratio of (thickness before load is applied):(thickness after load is applied for a certain time). In the aforementioned compression range, the load used to generate the 6-8% is 2 MPa. The 6-8% compression may be alternatively reported a 6-8% loss in thickness after the load is applied when compared to the original thickness before the load is applied. The compression is typically related to elasticity, as would be understood by those of skill in the art. The more elastic the friction material 10 is, the more return that will be observed after compression. This typically leads to less lining loss and formation of less hot spots, both of which are desirable. In additional non-limiting embodiments, all values and ranges of values within and including the aforementioned range endpoints are hereby expressly contemplated.

Compression of the friction material 10 may be further modified based on choice of the fibers, resin, filler, filler particle size, and substrate material weight. In additional non-limiting embodiments, all values and ranges of values within and including the aforementioned range endpoints are hereby expressly contemplated.

The friction material 10 of this disclosure, e.g. when used to form a friction plate 30, typically exhibits a dynamic coefficient of friction (COF), e.g. from 0.10 to 0.16, 0.11 to 0.15, from 0.12 to 0.14, or from 0.12 to 0.13, as determined using the test described below and the torque curve generated therefrom, as is appreciated by those of skill in the art. In various embodiments, the friction material 10 exhibits a steady or gradually decreasing torque curve over time, especially at lower speeds, as will be understood by those of skill in the art. In additional non-limiting embodiments, all values and ranges of values within and including the aforementioned range endpoints are hereby expressly contemplated.

The test used to determine the COF is conducted on a GK 3 test bench. Four double-sided friction plates 30 and the corresponding application DCT fluid are used to simulate the operating environment of a dual-clutch transmission 36 at vehicle launch at interface temperatures up to 440° C.

In various embodiments, the friction material 10 typically has a shear strength of greater than about 2,250, alternatively greater than about 2,500, alternatively from about 2,000 to about 10,000, alternatively from about 2,000 to about 8,000, alternatively from about 2,000 to about 5,000, alternatively from about 2,000 to about 4,000, alternatively from about 3,000 to about 5,000, alternatively from about 3,000 to about 4,000, kPa when tested in accordance with ASTM D3528-96. Regarding ASTM D3528-96, the test method is a double lap shear test performed on dry friction material 10 in ambient air with a total sample shear area of 4 in$^2$. Without being bound by theory, it is believed that the polyvinyl alcohol fibers 16 provide additional strength because they impact the homogeneity of the friction material 10 and also act as both a fiber and a binder.

Friction Plate:

The disclosure also provides a friction plate 30 that includes the substrate 32 (e.g. a metal plate), as first introduced above. The substrate 32 has (at least) two surfaces and the friction material 10 is typically bonded to one or both of these surfaces. Typically, the friction plate 30 is formed once the friction material 10 is adhered or bonded to one or both surfaces. The bonding or adherence of the friction material 10 to one or both surfaces may be achieved by any adhesive or means known in the art, e.g. a phenolic resin or any resin 20 described above. This disclosure also provides a clutch assembly that includes the friction plate 30 and a separator plate, as would be chosen by one of skill in the art. This disclosure also provides a transmission 36 that includes the clutch assembly. FIG. 8 is a perspective view of the transmission 36 having a cut-out showing the clutch assembly. The transmission 36 may be an automatic transmission 36 or a manual transmission 36.

Figure 2:
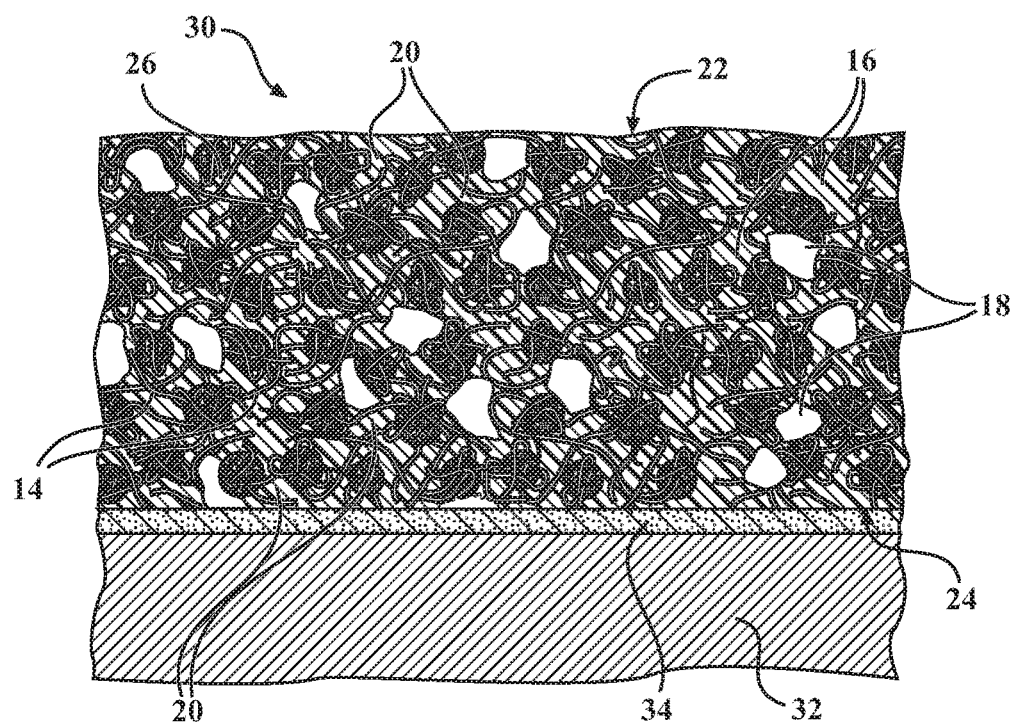
FIG. 2 is an enlarged cross-sectional view of a friction plate including the friction material of FIG. 1 and a substrate.

Referring now to FIG. 2, the friction plate 30 comprises the friction material 10, which is cured (i.e., including cured resin) bonded to the substrate 32 with the bonding adhesive 34. The bonding surface 24 of the friction material 10 is where bonding to the substrate 32 or other material is meant to be accomplished. As such, the bonding surface 24 of the friction material 10 is bonded to the substrate 32.

The friction material 10 is bonded to the substrate by any suitable technique known to skilled artisans. Typically, the friction material 10 is bonded to the substrate 32 with the bonding adhesive 34, which is generally known to those skilled art, e.g. with a bonding adhesive 34 comprising phenolic modified nitrile rubber. Exemplary substrates 32 include, but are not limited to, friction/clutch plates, synchronizer rings, and transmission 36 bands. The substrate 32 is typically metal.

As alluded to above, the various embodiments of the friction material 10 described herein may be used in a wet clutch. The friction generating surface 22 of the friction material 10 experiences interfacial frictional engagement with an opposed mating surface (not shown) in the presence of a lubricant. The friction generating surface 22 experiences select interfacial frictional engagement with an opposed, rotating surface (not shown) in the presence of a lubricant, and the bonding surface 24 achieves bonded attachment to the substrate 32 with the aid of the bonding adhesive 34 or some other suitable bonding technique. The lubricant may be any suitable lubricating fluid such as, for example, an automatic transmission fluid. While the friction material 10 performs satisfactorily in a wet clutch designed to maintain a temperature at the a friction generating surface 22 below 350° C., it may also be used in higher temperature environments above about 350, alternatively about 400, alternatively about 450, ° C. if desired.

In many embodiments, the friction material 10 of this disclosure, e.g. when used to form a friction plate 30, has a final lining thickness after curing of the resin and bonding to the metal plate, of from 0.4 to 1.2 mm. In other embodiments, this thickness is from 0.5 to 1.1, from 0.6 to 1, from 0.7 to 0.9, or from 0.8 to 0.9, mm. This may be alternatively described as T3, as first introduced above. In additional non-limiting embodiments, all values and ranges of values within and including the aforementioned range endpoints are hereby expressly contemplated.

In various embodiments, the friction material 10/friction plate 30 exhibits a percent compression from 10 to 30 percent or from 10 to 20 percent, e.g. from 11 to 19, 12 to 18, 13 to 17, 14 to 16, or 15, percent, as determined after measuring the thickness of the fibers and friction particles 14 (without resin 20; also known as "substrate material") before bonding to the substrate 32 as compared to the thickness of the friction material 10 (including the cured resin) after bonding to the substrate 32, as is understood by those of skill in the art. In various embodiments, the compression may be calculated using Ti and T3, as first introduced above. In additional non-limiting embodiments, all values and ranges of values within and including the aforementioned range endpoints are hereby expressly contemplated.

In even further embodiments, the friction material 10 of this disclosure, e.g. when used to form a friction plate 30, does not exhibit hot spots and/or heat stains, as would be understood by those in the art, after 10, 50, 100, 200, 500, 1000, or 2000, cycles, wherein a cycle is understood by those of skill in the art. In additional non-limiting embodiments, all values and ranges of values within and including the aforementioned range endpoints are hereby expressly contemplated.

Method of Forming the Friction Material:

This disclosure also provides a method of forming the friction material 10. The method comprises the steps of: combining the structural fibers 12, the friction particles 14, and polyvinyl alcohol fibers 16; impregnating the substrate material with the resin 20; and curing the resin 20 to form the friction material 20. The structural fibers 12, the friction particles 14, the polyvinyl alcohol fibers 16, the substrate material, the resin 20, and all of the other components are just as described above.

The step of combining the structural fibers 12, the friction particles 14, and polyvinyl alcohol fibers 16 is typically conducted in the presence of water. For example, the structural fibers 12, the friction particles 14, and polyvinyl alcohol fibers 16 and water can be combined in a mixture comprising greater than about 70, or about 80, or about 90, or from about 70 to about 95, or from about 80 to about 95, percent by weight water, based on the total weight of the mixture. In a typical embodiment, the polyvinyl alcohol fibers 16 used in the method start out with the diameter, length, denier, and other properties described above but these properties may change during processing due to the solubility of the polyvinyl alcohol fibers 16 in water.

In a typical embodiment 10, the friction material 10 is produced via a continuous manufacturing process on a manufacturing line. During the continuous manufacturing process, the structural fibers 12, the friction particles 14, and polyvinyl alcohol fibers 16 are combined to form substrate material having a desired width and thickness. The substrate material is moved along the manufacturing line and saturated with the resin 20. Once saturated with the resin 20, the substrate material is pulled through rollers which compress the fibrous web to desired thickness and squeeze out extra resin 20 to form the friction material 10. The friction material 10 exits the rollers and is conveyed through a series of ovens which remove water and cure the friction material 10. The friction material 10, which includes cured resin 20, is then rolled and typically stored for later use.

In such an embodiment, throughout the continuous manufacturing process, the fibrous substrate material must support itself because it is moved along the manufacturing line (e.g. between belts, rollers, ovens, etc.) while suspended in air in an unsupported manner (e.g. pulled through the air rather than conveyed on a conveyor). The polyvinyl alcohol fibers 16 provide excellent dry and wet strength which prevents the substrate material from tearing or breaking which can slow down or even stop the manufacturing process causing quality issues and costly "down time". Further, the polyvinyl alcohol fibers 16 provide a friction material having excellent shear strength and greater pore size (as described above).

In various other embodiments, the method further includes the step of optionally applying additional friction particles 14 and structural fibers 16 to the friction material 10 to form a deposit on the friction generating surface 22.

In various embodiments, the friction material 10 may be impregnated with the phenolic or phenolic based resin and then heated to a desired temperature for a predetermined length of time to form the friction material 10. The heating cures the phenolic resin at a temperature of about 350° F.-450° F. When other resins are present, such as a silicone resin, the heating cures the silicone resin at a temperature of about 350° F.-700° F. Thereafter, the impregnated and cured friction material 10 may be adhered to the desired substrate 32 by suitable means.

The following examples are intended to illustrate the present invention and are not to be viewed in any way as limiting to the scope of the present invention.

Examples

An example of a friction material representative of this disclosure (Example 1) is formed along with two comparative examples of friction materials that are not representative of this disclosure (Comparative Examples 1 and 2). Examples 1 and Comparative Examples 1 and 2 are evaluated to determine a variety of physical properties, as set forth below. The compositions of Example 1 and Comparative Examples 1 and 2 are set forth below in Table 1 wherein the components are set forth in weight percent based on a total weight of the friction material.

TABLE 1

|  | Components | Comparative Example 1 | Comparative Example 2 | Example 1 |
|---|---|---|---|---|
| Friction Material | Fibers A and B | 60-70 wt % | 60-70 wt % | 60-70 wt % |
|  | Friction Particles A and B | 30-40 wt % | 30-40 wt % | 30-40 wt % |
|  | Comparative Polyvinyl Alcohol Fiber | — | 2-5 wt % | — |
|  | Polyvinyl Alcohol Fiber | — | — | 2-5 wt % |
| Curable Resin | Phenolic Resin | 30-45 wt % | 30-45 wt % | 30-45 wt % |

TABLE 1-continued

| | Components | Comparative Example 1 | Comparative Example 2 | Example 1 |
|---|---|---|---|---|
| Performance Properties | Weight of Material (lb/3000 ft² of surface area) | 100-150 lbs | 100-150 lbs | 100-150 lbs |
| | Density (g/cm³) | 0.5 to 0.75 | 0.5 to 0.75 | 0.5 to 0.75 |
| | Wet Tensile Strength of Friction Material (g/in) ASTM D828-97 | 1583 +/− 75 | 3150 +/− 122 | 3933 +/− 234 |
| | Dry Tensile Strength of Friction Material (g/in) ASTM D828-97 | 2900 +/− 89 | 4483 +/− 194 | 5467 +/− 137 |
| | Shear Strength of Friction Material (kPa) ASTM D3528-96 | 1820 +/− 300 | 2020 +/− 230 | 2620 +/− 370 |

The amount of resin utilized is typically described in the art as "resin pick up." The amount of resin set forth in Table 1 is a weight percent based on a total weight of the friction material.

Fibers A and B are aramid fibers and carbon fibers.

Friction Particles A and B are graphite and diatomaceous earth.

Comparative Polyvinyl Alcohol Fiber is polyvinyl alcohol fibers having an average diameter of 11 µm, an average denier of 1.0, and an average length of 4 mm.

Polyvinyl Alcohol Fiber is polyvinyl alcohol fibers having an average diameter of 6 µm, an average denier of 0.4, and an average length of 3 mm.

The Friction Materials are cured via heating the resin impregnated friction material for a pre-determined amount of time at a temperature of approximately 350-450° F., and allowing the friction material to cool to room temperature.

Referring now to Table 1, the Friction Material of Example 1, which includes approximately 3% Polyvinyl Alcohol Fiber, exhibits excellent tensile strength (both dry and wet). Regarding "dry" tensile strength, the Friction Material of Example 1 demonstrates a 88.5% increase in dry tensile strength over Comparative Example 1 (which does not include Polyvinyl Alcohol Fiber) and a 21.9% increase in dry tensile strength over Comparative Example 2 (which includes a Comparative Polyvinyl Alcohol Fiber having a greater diameter, length, and denier than Polyvinyl Alcohol Fiber). Regarding "wet" tensile strength, the Friction Material of Example 1 demonstrates a 148.5% increase in wet tensile strength over Comparative Example 1 (which does not include Polyvinyl Alcohol Fiber) and a 24.9% increase in wet tensile strength over Comparative Example 2 (which includes a Comparative Polyvinyl Alcohol Fiber having a greater diameter, length, and denier than Polyvinyl Alcohol Fiber).

Further, the Friction Material of Example 1 (formed via curing the resin) exhibits excellent shear strength. Regarding shear strength, the Friction Material of Example 1 demonstrates a 44.0% increase in shear strength over Comparative Example 1 (which does not include Polyvinyl Alcohol Fiber) and a 29.7% increase in shear strength over Comparative Example 2 (which includes a Comparative Polyvinyl Alcohol Fiber having a greater diameter, length, and denier than Polyvinyl Alcohol Fiber).

All combinations of the aforementioned embodiments throughout the entire disclosure are hereby expressly contemplated in one or more non-limiting embodiments even if such a disclosure is not described verbatim in a single paragraph or section above. In other words, an expressly contemplated embodiment may include any one or more elements selected and combined from any portion of the disclosure.

One or more of the values described above may vary by ±5%, ±10%, ±15%, ±20%, ±25%, etc. so long as the variance remains within the scope of the disclosure. Unexpected results may be obtained from each member of a Markush group independent from all other members. Each member may be relied upon individually and or in combination and provides adequate support for specific embodiments within the scope of the appended claims. The subject matter of all combinations of independent and dependent claims, both singly and multiply dependent, is herein expressly contemplated. The disclosure is illustrative including words of description rather than of limitation. Many modifications and variations of the present disclosure are possible in light of the above teachings, and the disclosure may be practiced otherwise than as specifically described herein.

It is also to be understood that any ranges and subranges relied upon in describing various embodiments of the present disclosure independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present disclosure, and such ranges and subranges may be further delineated into relevant halves, thirds, quarters, fifths, and so on. As just one example, a range "of from 0.1 to 0.9" may be further delineated into a lower third, i.e. from 0.1 to 0.3, a middle third, i.e. from 0.4 to 0.6, and an upper third, i.e. from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

What is claimed is:

1. A friction material presenting a friction generating surface and a bonding surface facing opposite said friction generating surface, said friction material comprising the cured product of:
   (A) structural fibers;
   (B) friction particles;
   (C) polyvinyl alcohol fibers different than said structural fibers; and
   (D) a resin;
   wherein said polyvinyl alcohol fibers have an average diameter of less than about 11 µm, an average length of less than about 4 mm, and an average denier of less than about 1, and are combined with said structural fibers and said friction particles in the presence of water, and wherein said polyvinyl alcohol fibers solubilize and bind said structural fibers and said friction particles such that said friction material has an average pore size of from about 5 to about 100 pm and a density of from about 0.4 to about 1.5 g/cm$^3$.

2. The friction material as set forth in claim 1, wherein said polyvinyl alcohol fibers have an average diameter of from about 3 to about 9 µm and average length of less than about 3.5 mm.

3. The friction material as set forth in claim 1, wherein said polyvinyl alcohol fibers are soluble in water at a temperature of 60° C. or greater.

4. The friction material as set forth in claim 1 having a shear strength of greater than about 2,500 kPa when tested in accordance with ASTM D3528-96.

5. The friction material as set forth in claim 1, wherein said polyvinyl alcohol fibers comprise polyvinyl alcohol having a number average molecular weight of from about 2,000 to about 800,000 g/mol.

6. The friction material as set forth in claim 1, wherein said friction particles are selected from the group consisting of silica, carbon, graphite, alumina, magnesia, calcium oxide, titania, ceria, zirconia, cordierite, mullite, sillimanite, spodumene, petalite, zircon, silicon carbide, titanium carbide, boron carbide, hafnium carbide, silicon nitride, titanium nitride, titanium boride, cashew nut, rubber, and combinations thereof, and said friction particles are present in an amount of from about 10 to about 100 lbs per 3000 ft$^2$ of said friction generating surface;
   said structural fibers are selected from the group consisting of acrylic fibers, aramid fibers, carbon fibers, cellulose fibers, and combinations thereof, and said structural fibers are present in an amount of from about 2 to about 150 lbs per 3000 ft$^2$ of said friction generating surface; and
   said resin is a phenolic resin and/or a modified phenolic resin, and wherein said resin is present in an amount of less than about 75 weight percent based on 100 parts by weight of said friction material.

7. A friction plate comprising a substrate bonded to said bonding surface of said friction material set forth in claim 1.

8. A wet clutch assembly comprising said friction plate of claim 7 and a separator plate.

9. A method of forming a friction material comprising a friction generating surface and a bonding surface facing opposite said friction generating surface, said method comprising the steps of:
   combining structural fibers, friction particles, and polyvinyl alcohol fibers different than said structural fibers, said polyvinyl alcohol fibers having an average diameter of less than about 11 µm, an average length of less than about 4 mm, an average denier of less than about 1, to form a substrate material;
   impregnating said substrate material with a resin; and
   curing said resin to form said friction material;
   wherein said friction material has an average pore size of from about 5 to about 100 µm and a density of from about 0.4 to about 1.5 g/cm$^3$.

10. The method as set forth in claim 9, wherein said polyvinyl alcohol fibers have an average diameter of from about 3 to about 9 µm and average length of less than about 3.5 mm.

11. The method as set forth in claim 9, wherein said polyvinyl alcohol fibers have an average denier of from about 0.2 to about 0.9.

12. The method as set forth in claim 9, wherein said polyvinyl alcohol fibers comprise polyvinyl alcohol having a number average molecular weight of from about 2,000 to about 800,000 g/mol.

13. The method as set forth in claim 9 wherein said polyvinyl alcohol fibers are soluble in water at a temperature of 60° C. or greater.

14. The method as set forth in claim 9, wherein said polyvinyl alcohol fibers are present in said friction material in an amount of from about 2 to about 25 lbs per 3000 ft$^2$ of said friction generating surface.

15. The method as set forth in claim 9, wherein said friction particles are selected from the group consisting of silica, carbon, graphite, alumina, magnesia, calcium oxide, titania, ceria, zirconia, cordierite, mullite, sillimanite, spodumene, petalite, zircon, silicon carbide, titanium carbide, boron carbide, hafnium carbide, silicon nitride, titanium nitride, titanium boride, cashew nut, rubber, and combinations thereof, and said friction particles are present in an amount of from about 10 to about 100 lbs per 3000 ft$^2$ of said friction generating surface.

16. The method as set forth in claim 9, wherein said structural fibers are selected from the group consisting of acrylic fibers, aramid fibers, carbon fibers, cellulose fibers, and combinations thereof, and said structural fibers are present in an amount of from about 2 to about 150 lbs per 3000 ft$^2$ of said friction generating surface.

17. The method as set forth in claim 9, wherein said substrate material has a thickness of from about 0.3 to about 5 mm and wherein said substrate material has:
   a wet tensile strength of greater than about 3,250 Win when tested in accordance with ASTM D828-97; and/or
   a dry tensile strength of greater than about 4,500 g/in when tested in accordance with ASTM D828-97.

18. The method as set forth in claim 9, wherein said resin is a phenolic resin and/or a modified phenolic resin, and wherein said resin is present in an amount of less than about 75 weight percent based on 100 parts by weight of said friction material.

19. The method as set forth in claim 9, wherein said friction material has a shear strength of greater than about 2,500 kPa when tested in accordance with ASTM D3528-96.

* * * * *

UNITED STATES PATENT AND TRADEMARK OFFICE
CERTIFICATE OF CORRECTION

PATENT NO. : 10,989,263 B2
APPLICATION NO. : 16/348931
DATED : April 27, 2021
INVENTOR(S) : Jason Bares et al.

Page 1 of 1

It is certified that error appears in the above-identified patent and that said Letters Patent is hereby corrected as shown below:

In the Claims

Claim 1, Column 21, Line 36, please delete "about 5 to about 100 pm" and replace with -- about 5 to about 100 μm --

Claim 17, Column 22, Line 61, please delete "about 3,250 Win" and replace with -- about 3,250 g/in" --

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*